United States Patent
Pullagurla et al.

(10) Patent No.: US 12,534,087 B2
(45) Date of Patent: Jan. 27, 2026

(54) PREDICTION OF ROAD GRADE FOR AUTONOMOUS VEHICLE NAVIGATION

(71) Applicant: TORC Robotics, Inc., Blacksburg, VA (US)

(72) Inventors: Harish Pullagurla, Blacksburg, VA (US); Zachary Miller, Blacksburg, VA (US); Andrew Cunningham, Blacksburg, VA (US)

(73) Assignee: TORC Robotics, Inc., Blacksburg, VA (US)

( * ) Notice: Subject to any disclaimer, the term of this patent is extended or adjusted under 35 U.S.C. 154(b) by 97 days.

(21) Appl. No.: 18/222,384

(22) Filed: Jul. 14, 2023

(65) Prior Publication Data

US 2025/0018953 A1    Jan. 16, 2025

(51) Int. Cl.
  *B60W 40/00*    (2006.01)
  *B60W 40/076*   (2012.01)
  *B60W 60/00*    (2020.01)

(52) U.S. Cl.
  CPC ........ *B60W 40/076* (2013.01); *B60W 60/001* (2020.02); *B60W 2420/408* (2024.01); *B60W 2556/45* (2020.02)

(58) Field of Classification Search
  CPC ............. B60W 40/076; B60W 60/001; B60W 2420/408; B60W 2556/45
  See application file for complete search history.

(56) References Cited

U.S. PATENT DOCUMENTS

| | | | |
|---|---|---|---|
| 11,655,893 B1 * | 5/2023 | Pertsel | F16H 61/0204 |
| 2015/0166073 A1 * | 6/2015 | D'Amato | B60W 40/076 |
| 2021/0070299 A1 * | 3/2021 | Dempsey | B60W 30/18136 |
| 2021/0078584 A1 * | 3/2021 | Janampally | B60W 40/076 |
| 2022/0092532 A1 * | 3/2022 | Bevan | G06Q 10/0833 |
| 2023/0278557 A1 * | 9/2023 | Bando | B60W 30/143 |
| 2023/0323635 A1 * | 10/2023 | Hoshino | E02F 9/2235 |
| 2023/0406320 A1 * | 12/2023 | Guo | B60W 40/06 |
| 2024/0326840 A1 * | 10/2024 | Diamond | B60W 50/0225 |

FOREIGN PATENT DOCUMENTS

EP    3871938 A1 *    6/2019    ............ B60W 40/00

OTHER PUBLICATIONS

Sahlholm, Per & Karl, Henrik & Johansson, Karl. (2008). Road Grade Estimation for Look-Ahead Vehicle Control. IFAC Proceedings Volumes (IFAC-PapersOnline). 17. 10.3182/20080706-5-KR-1001.00574. (Year: 2008).*

(Continued)

*Primary Examiner* — Ramya P Burgess
*Assistant Examiner* — Brittany Renee Peko
(74) *Attorney, Agent, or Firm* — Armstrong Teasdale LLP (57) ABSTRACT

Systems and methods of predicting a grade of a road upon which a vehicle is traveling are disclosed. An autonomous vehicle system can receive sensor data from a sensor measuring a response from at least one mechanical component of the autonomous vehicle as the autonomous vehicle navigates a road; detect a speed of the autonomous vehicle; determine a predicted grade of the road based on the sensor data and the speed; and navigate the autonomous vehicle based on the predicted grade of the road.

16 Claims, 4 Drawing Sheets

(56) References Cited

OTHER PUBLICATIONS

Shetty, Gautam, et al. "Road slope prediction and vehicle dynamics control for autonomous vehicles." arXiv preprint arXiv:2210.05741 (2022). (Year: 2022).*

Wang, Xin & Song, Guohua & Wu, Yizheng & Zhai, Zhiqiang. (2022). Road Grade Estimation Based on Power Demand Difference of Heavy-Duty Diesel Trucks for Emission Estimation. Transportation Research Record: Journal of the Transportation Research Board. 2677. 036119812210984. 10.1177/03611981221098400. (Year: 2022).*

* cited by examiner

PREDICTION OF ROAD GRADE FOR AUTONOMOUS VEHICLE NAVIGATION

TECHNICAL FIELD

The present disclosure relates to autonomous vehicles and, more specifically, to predicting a grade of roads upon which autonomous vehicles are traveling.

BACKGROUND

The use of autonomous vehicles has become increasingly prevalent in recent years, with the potential for numerous benefits. One challenge faced by autonomous vehicles is modeling the surroundings of the autonomous vehicle. The grade of a road can affect fuel efficiency and energy expenditure, path planning, general navigation, and object detection capabilities of autonomous vehicles.

Although conventional approaches based on satellite navigation systems, such as the global positioning system (GPS), may be utilized to estimate the grade of a road, such approaches return inaccurate results, particularly in urban environments where signal reception can be impaired. Similar issues with respect to accuracy occur when utilizing acceleration sensors such as inertial measurement units, because integration of small errors or noise in the IMU sensor data over time accumulate to produce inaccurate and unreliable estimations. These errors in road grade information may impair the ability of an autonomous vehicle to navigate properly.

SUMMARY

The systems and methods of the present disclosure may solve the problems set forth above and/or other problems in the art. The scope of the current disclosure, however, is defined by the attached claims, and not by the ability to solve any specific problem.

Disclosed herein are techniques to automatically estimate the grade of a road for mapping and navigation purposes using the performance of an engine of a vehicle. The amount of power required by the engine to navigate the vehicle, while compensating for factors including vehicle load and wind resistance, can be utilized to determine an accurate approximation of an uphill or downhill gradient for the road upon which the vehicle is traveling. This is because the load caused by an uphill or downhill gradient will affect the amount of power required by the engine to automatically maintain the speed of the vehicle as it travels.

Additionally, light detection and ranging (LiDAR) sensors as well as image sensors (e.g., cameras) may be utilized to estimate digital surface models of roads. For example, points generated by the LiDAR sensors and images captured by the image sensors can be utilized to generate the digital surface model as the vehicle is traveling on the road. The digital surface model may be utilized to assist with autonomous vehicle navigation, the generation of a world model or mapping data, and may be utilized in combination with the grade estimation techniques to more accurately predict the grade of the road upon which the vehicle is traveling.

One embodiment is directed to a system. The system includes one or more processors of an autonomous vehicle. The system can receive sensor data from a sensor measuring a response from at least one mechanical component of the autonomous vehicle as the autonomous vehicle navigates a road; determine a speed of the autonomous vehicle; determine a predicted grade of the road based on the sensor data and the speed; and navigate the autonomous vehicle based on the predicted grade of the road.

The sensor may comprise a rotational speed sensor, a torque sensor, or a throttle position sensor. The mechanical component may comprise an engine of the autonomous vehicle, and the one or more processors are further configured to determine a power output of the engine. The system may determine the predicted grade of the road based on the power output of the engine and the speed. The autonomous vehicle may comprise a LiDAR sensor. The system may determine the predicted grade of the road further based on LiDAR points captured by the LiDAR sensor.

The system may determine the predicted grade of the road further based on a weight of the autonomous vehicle. The system may receive the weight of the autonomous vehicle from an external computing device. The system may transmit the predicted grade of the road to one or more remote servers. The system may execute an object detection model to detect an object on the road based on the predicted grade of the road. The system may update map data stored in memory of the autonomous vehicle based on the grade of the road.

Another embodiment of the present disclosure is directed to a method. The method may be performed, for example, by one or more processors of an autonomous vehicle. The method includes receiving sensor data from a sensor measuring a response from at least one mechanical component of the autonomous vehicle as the autonomous vehicle navigates a road; determining a speed of the autonomous vehicle; determining a predicted grade of the road based on the sensor data and the speed; and navigating the autonomous vehicle based on the predicted grade of the road.

The sensor may comprise a rotational speed sensor, a torque sensor, or a throttle position sensor. The mechanical component may comprise an engine of the autonomous vehicle, and the one or more processors are further configured to determine a power output of the engine. The method may include determining, by the one or more processors, the predicted grade of the road based on the power output of the engine and the speed. The autonomous vehicle may comprise a LiDAR sensor, and the method may include determining the predicted grade of the road further based on LiDAR points captured by the LiDAR sensor.

The method may include determining the predicted grade of the road further based on a weight of the autonomous vehicle. The method may include receiving the weight of the autonomous vehicle from an external computing device. The method may include transmitting the predicted grade of the road to one or more remote servers. The method may include executing an object detection model to detect an object on the road based on the predicted grade of the road. The method may include updating map data stored in memory of the autonomous vehicle based on the grade of the road.

BRIEF DESCRIPTION OF THE DRAWINGS

The accompanying drawings, which are incorporated in and constitute a part of this specification, illustrate various exemplary embodiments and, together with the description, serve to explain the principles of the disclosed embodiments.

DETAILED DESCRIPTION

The following detailed description describes various features and functions of the disclosed systems and methods with reference to the accompanying figures. In the figures, similar components are identified using similar symbols, unless otherwise contextually dictated. The exemplary system(s) and method(s) described herein are not limiting, and it may be readily understood that certain aspects of the disclosed systems and methods can be variously arranged and combined, all of which arrangements and combinations are contemplated by this disclosure.

Figure 1:
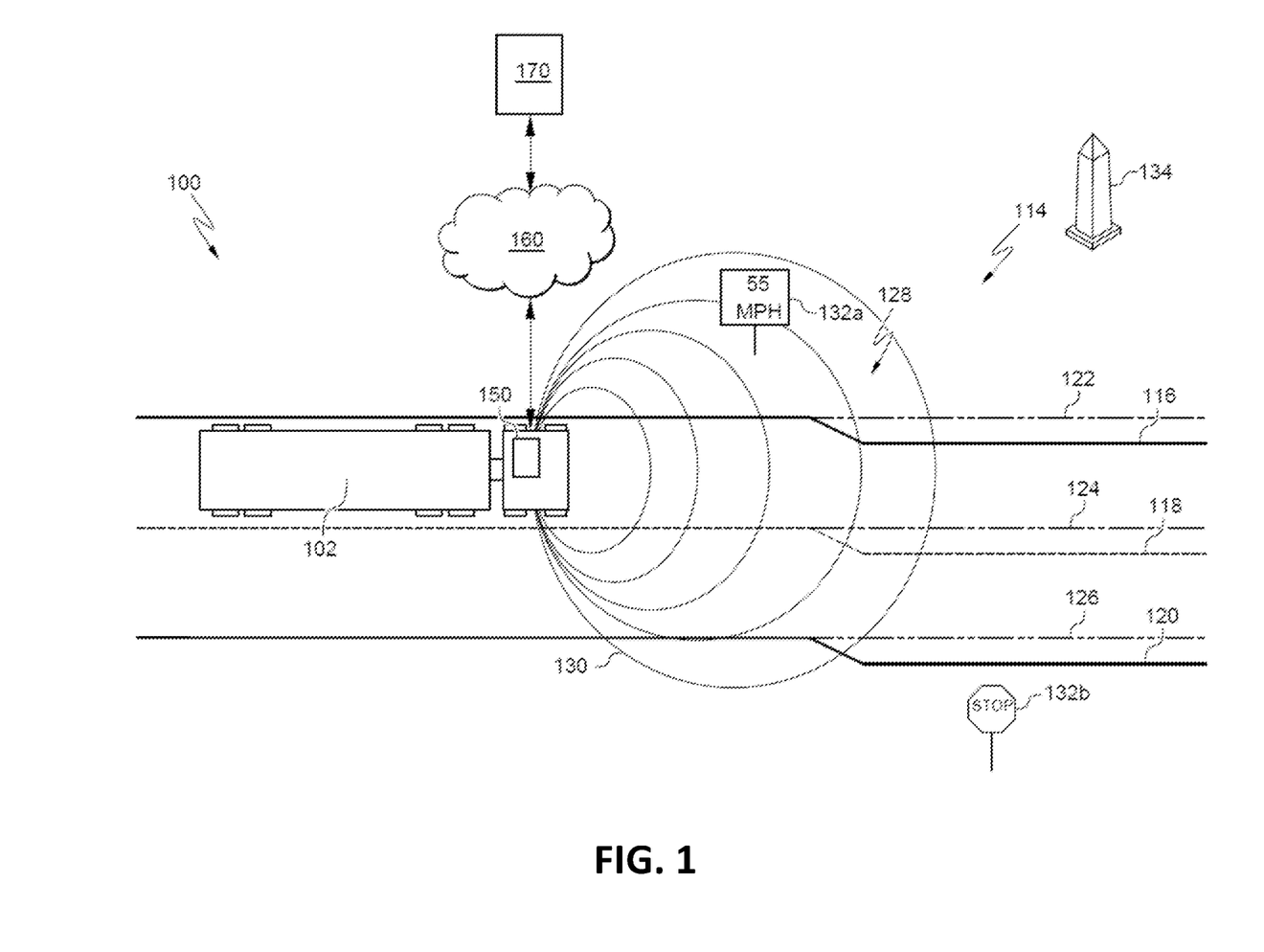
FIG. 1 is a bird's eye view of a roadway including a schematic representation of a vehicle and aspects of an autonomy system of the vehicle, according to an embodiment.

Referring to FIG. 1, the present disclosure relates to autonomous vehicles, such as an autonomous truck 102 having an autonomy system 150. The autonomy system 150 of truck 102 may be completely autonomous (fully autonomous), such as self-driving, driverless, or Level 4 autonomy, or semi-autonomous, such as Level 3 autonomy. As used herein the term "autonomous" includes both fully autonomous and semi-autonomous. The present disclosure sometimes refers to autonomous vehicles as ego vehicles. The autonomy system 150 may be structured on at least three aspects of technology: (1) perception, (2) localization, and (3) planning/control. The function of the perception aspect is to sense an environment surrounding truck 102 and interpret it. To interpret the surrounding environment, a perception module or engine in the autonomy system 150 of the truck 102 may identify and classify objects or groups of objects in the environment. For example, a perception module associated with various sensors (e.g., LiDAR, camera, radar, etc.) of the autonomy system 150 may identify one or more objects (e.g., pedestrians, vehicles, debris, signs, etc.) and features of the road (e.g., lane lines, shoulder lines, geometries of road features, lane types, etc.) around truck 102, and classify the objects in the road distinctly.

The localization aspect of the autonomy system 150 may be configured to determine where on a pre-established digital map the truck 102 is currently located. One way to do this is to sense the environment surrounding the truck 102 (e.g., via the perception system) and to correlate features of the sensed environment with details (e.g., digital representations of the features of the sensed environment) on the digital map. The digital map may be stored locally in the memory of the truck 102. In some implementations, map data corresponding to the location of the truck 102 may be retrieved from memory and utilized for navigation tasks. For example, map data corresponding to a predetermined radius around, or a predetermined region in front of, the truck 102 may be retrieved and utilized for navigation. In some implementations, locally stored map data may be updated with indications of a predicted road grade, based on the techniques described herein.

Once the systems on the truck 102 have determined its location with respect to the digital map features (e.g., location on the roadway, upcoming intersections, road signs, etc.), the truck 102 can plan and execute maneuvers and/or routes with respect to the features of the environment. The planning/control aspects of the autonomy system 150 may be configured to make decisions about how the truck 102 should move through the environment to get to its goal or destination. It may consume information from the perception and localization modules to know where it is relative to the surrounding environment and what other objects and traffic actors are doing. Detection of objects in the environment may be performed, in some implementations, after predicting a grade of the road. The grade of the road can be utilized in object detection and classification processes to correctly identify the positions and predicted trajectories of different types of objects in the environment with respect to the truck 102.

FIG. 1 further illustrates an environment 100 for modifying one or more actions of truck 102 using the autonomy system 150. The truck 102 is capable of communicatively coupling to a remote server 170 via a network 160. The truck 102 may not necessarily connect with the network 160 or server 170 while it is in operation (e.g., driving down the roadway). That is, the server 170 may be remote from the vehicle, and the truck 102 may deploy with all the necessary perception, localization, and vehicle control software and data necessary to complete its mission fully-autonomously or semi-autonomously.

While this disclosure refers to a truck (e.g., a tractor trailer) 102 as the autonomous vehicle, it is understood that the truck 102 could be any type of vehicle, including an automobile, a mobile industrial machine, etc. While the disclosure will discuss a self-driving or driverless autonomous system, it is understood that the autonomous system could alternatively be semi-autonomous, having varying degrees of autonomy or autonomous functionality.

Figure 2:
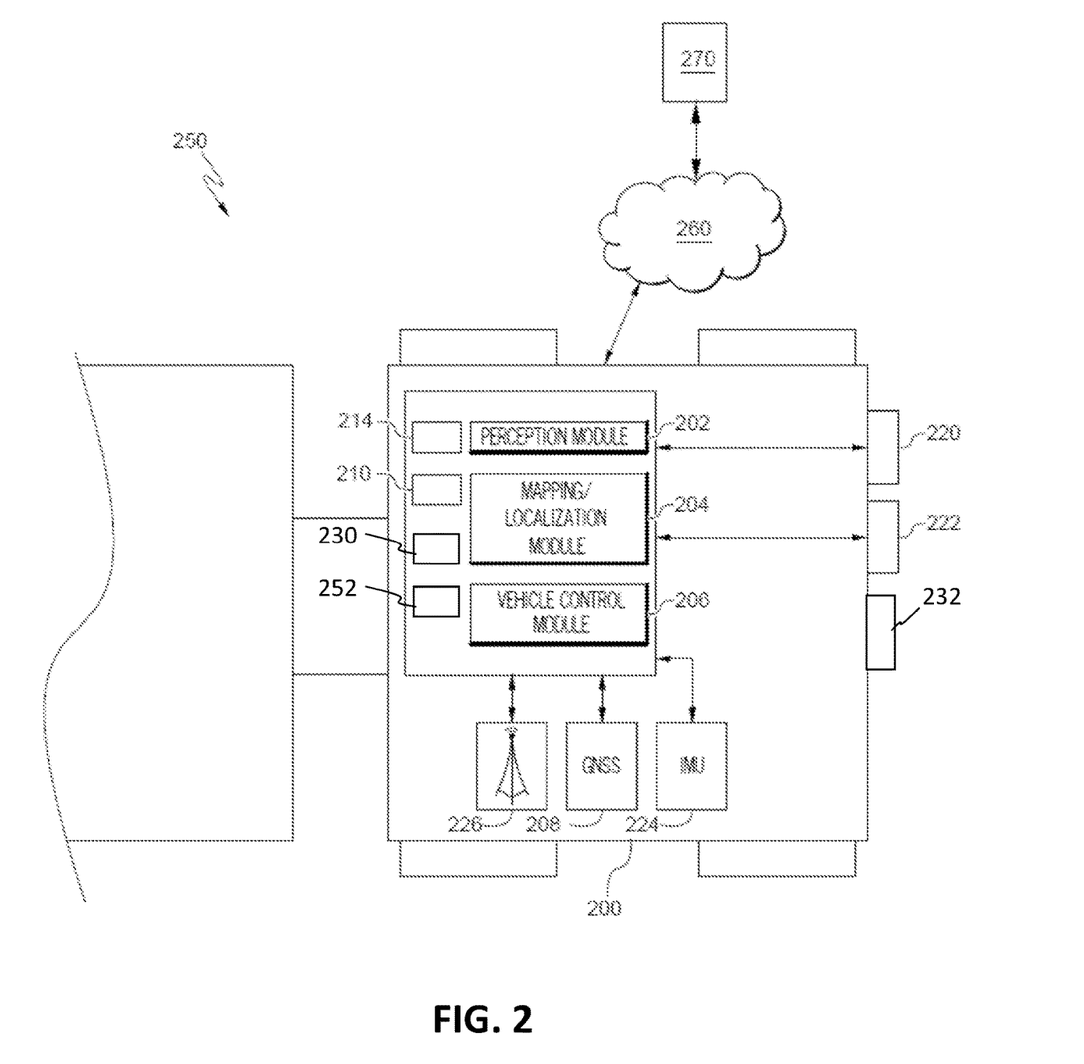
FIG. 2 is a schematic of the autonomy system of the vehicle, according to an embodiment.

With reference to FIG. 2, an autonomy system 250 of a truck 200 (e.g., which may be similar to the truck 102 of FIG. 1) may include a perception system including a camera system 220, a LiDAR system 222, a radar system 232, a GNSS receiver 208, an inertial IMU 224, and/or a perception module 202. The autonomy system 250 may further include a transceiver 226, a processor 210, a memory 214, a mapping/localization module 204, and a vehicle control module 206. The various systems may serve as inputs to and receive outputs from various other components of the autonomy system 250. In other examples, the autonomy system 250 may include more, fewer, or different components or systems, and each of the components or system(s) may include more, fewer, or different components. Additionally, the systems and components shown may be combined or divided in many ways. As shown in FIG. 1, the perception systems aboard the autonomous vehicle may help the truck 102 perceive its environment out to a perception radius 130. The actions of the truck 102 may depend on the extent of perception radius 130.

The camera system 220 of the perception system may include one or more cameras mounted at any location on the truck 102, which may be configured to capture images of the environment surrounding the truck 102 in any aspect or field of view (FOV). The FOV can have any angle or aspect such that images of the areas ahead of, to the side, and behind the truck 102 may be captured. In some embodiments, the FOV may be limited to particular areas around the truck 102 (e.g., ahead of the truck 102) or may surround 360 degrees of the truck 102. In some embodiments, the image data generated by the camera system(s) 220 may be sent to the perception module 202 and stored, for example, in memory 214.

The LiDAR system 222 may include a laser generator and a detector and can send and receive laser rangefinding. The individual laser points can be emitted to and received from any direction such that LiDAR point clouds (or "LiDAR images") of the areas ahead of, to the side of, and behind the truck 200 can be captured and stored. In some embodiments, the truck 200 may include multiple LiDAR systems, and point cloud data from the multiple systems may be stitched together. In some embodiments, the system inputs from the camera system 220 and the LiDAR system 222 may be fused (e.g., in the perception module 202). The LiDAR system 222 may include one or more actuators to modify a position and/or orientation of the LiDAR system 222 or components thereof.

The LiDAR system 222 may be configured to use ultraviolet (UV), visible, or infrared light to image objects and can be used with a wide range of targets. In some embodiments, the LiDAR system 222 can be used to map physical features of an object with high resolution (e.g., using a narrow laser beam). In some examples, the LiDAR system 222 may generate a point cloud, and the point cloud may be rendered to visualize the environment surrounding the truck 200 (or object(s) therein). In some embodiments, the point cloud may be rendered as one or more polygon(s) or mesh model(s) through, for example, surface reconstruction. The LiDAR system 222 may produce point clouds that represent the environment surrounding the autonomous vehicle, which may be utilized in connection with the techniques described herein to predict the grade of the road. In some implementations, the point clouds generated using the LiDAR system 222 may be utilized to generate a digital surface map of the environment. Collectively, the LiDAR system 222 and the camera system 220 may be referred to herein as "imaging systems."

The radar system 232 may estimate strength or effective mass of an object, as objects made of paper or plastic may be weakly detected. The radar system 232 may be based on 24 GHz, 77 GHz, or other frequency radio waves. The radar system 232 may include short-range radar (SRR), mid-range radar (MRR), or long-range radar (LRR). One or more sensors may emit radio waves, and a processor can process the received reflected data (e.g., raw radar sensor data). In some implementations, the information returned by the radar system 232 may be utilized to generate a digital surface map of the environment surrounding the vehicle. The information returned by the radar system 232 may also be utilized in predicting the grade of the road upon which the vehicle is traveling (or other roads within the FOV of the radar system 232 and/or other sensors of the vehicle).

The GNSS receiver 208 may be positioned on the truck 200 and may be configured to determine a location of the truck 200 via GNSS data, as described herein. The GNSS receiver 208 may be configured to receive one or more signals from a global navigation satellite system (GNSS) (e.g., global positioning system (GPS), etc.) to localize the truck 200 via geolocation. The GNSS receiver 208 may provide an input to and otherwise communicate with mapping/localization module 204 to, for example, provide location data for use with one or more digital maps, such as an HD map (e.g., in a vector layer, in a raster layer or other semantic map, etc.). In some embodiments, the GNSS receiver 208 may be configured to receive updates from an external network. The GNSS receiver 208 may produce a rough estimation of the elevation of the vehicle, which, in some implementations, may be utilized in part to estimate the grade of the road upon which the vehicle is traveling.

The IMU 224 may be an electronic device that measures and reports one or more features regarding the motion of the truck 200. For example, the IMU 224 may measure a velocity, an acceleration, an angular rate, and/or an orientation of the truck 200 or one or more of its individual components using a combination of accelerometers, gyroscopes, and/or magnetometers. The IMU 224 may detect linear acceleration using one or more accelerometers and detect rotational rate using one or more gyroscopes. In some embodiments, the IMU 224 may be communicatively coupled to the GNSS receiver 208 and/or the mapping/localization module 204, to help determine a real-time location of the truck 200 and predict a location of the truck 200 even when the GNSS receiver 208 cannot receive satellite signals. The IMU 224 may return acceleration information, which may be utilized in part to predict the grade of the road upon which the vehicle is traveling.

The transceiver 226 may be configured to communicate with one or more external networks 260 via, for example, a wired or wireless connection to send and receive information (e.g., to a remote server 270). The wireless connection may be a wireless communication signal (e.g., Wi-Fi, cellular, LTE, 5G, etc.) In some embodiments, the transceiver 226 may be configured to communicate with external network(s) via a wired connection, such as, for example, during initial installation, testing, or service of the autonomy system 250 of the truck 200. A wired/wireless connection may be used to download and install various lines of code in the form of digital files (e.g., HD digital maps), executable programs (e.g., navigation programs), and other computer-readable code that may be used by the system 250 to navigate the truck 200 or otherwise operate the truck 200, either fully-autonomously or semi-autonomously. The digital files, executable programs, and other computer-readable code may be stored locally or remotely and may be routinely updated (e.g., automatically or manually) via the transceiver 226 or updated on demand.

In some embodiments, the truck 200 may not be in constant communication with the network 260, and updates which would otherwise be sent from the network 260 to the truck 200 may be stored at the network 260 until such time as the network connection is restored. In some embodiments, the truck 200 may deploy with all the data and software it needs to complete a mission (e.g., necessary perception, localization, and mission planning data) and may not utilize any connection to network 260 during some or the entire mission. Additionally, the truck 200 may send updates to the network 260 (e.g., regarding unknown or newly detected features in the environment as detected by perception systems) using the transceiver 226. For example, when the truck 200 detects differences between the perceived environment and the features on a digital map, the truck 200 may provide updates to the network 260 with information, as described in greater detail herein.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. Autonomy system 250 may include a single microprocessor or multiple microprocessors that may include means for identifying and reacting to differences between features in the perceived environment and features of the maps stored on the truck. Numerous commercially available microprocessors can be configured to perform the functions of the autonomy system 250. It should be appreciated that the autonomy system 250 could include a general machine controller capable of controlling numerous other machine functions. Alternatively, a special-purpose machine controller could be provided. Further, the autonomy system 250, or portions thereof, may be located remotely from the system 250. For example, one or more features of the mapping/localization module 204 could be located remotely from the truck. Various other known circuits may be associated with the autonomy system 250, including signal-conditioning circuitry, communication circuitry, actuation circuitry, and other appropriate circuitry.

Figure 3:
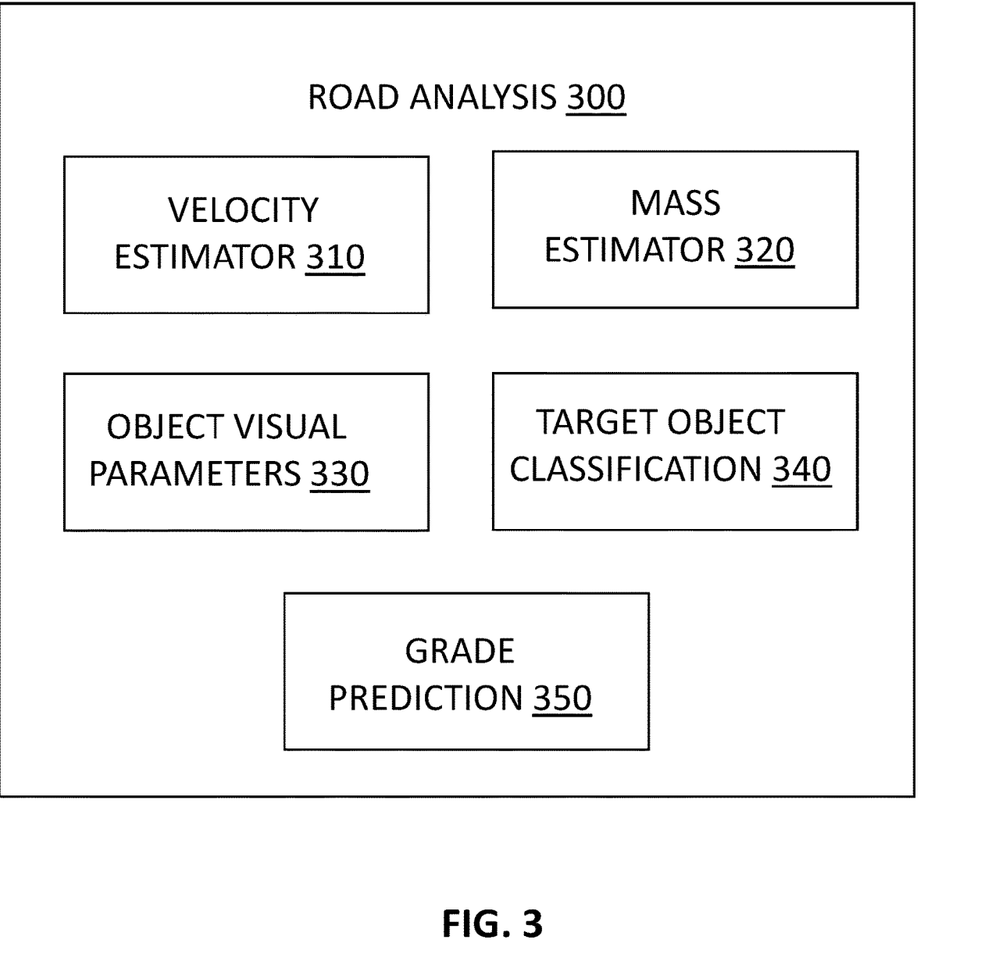
FIG. 3 is a schematic diagram of a road analysis module of the autonomy system of an autonomous vehicle, according to an embodiment.
Figure 4:
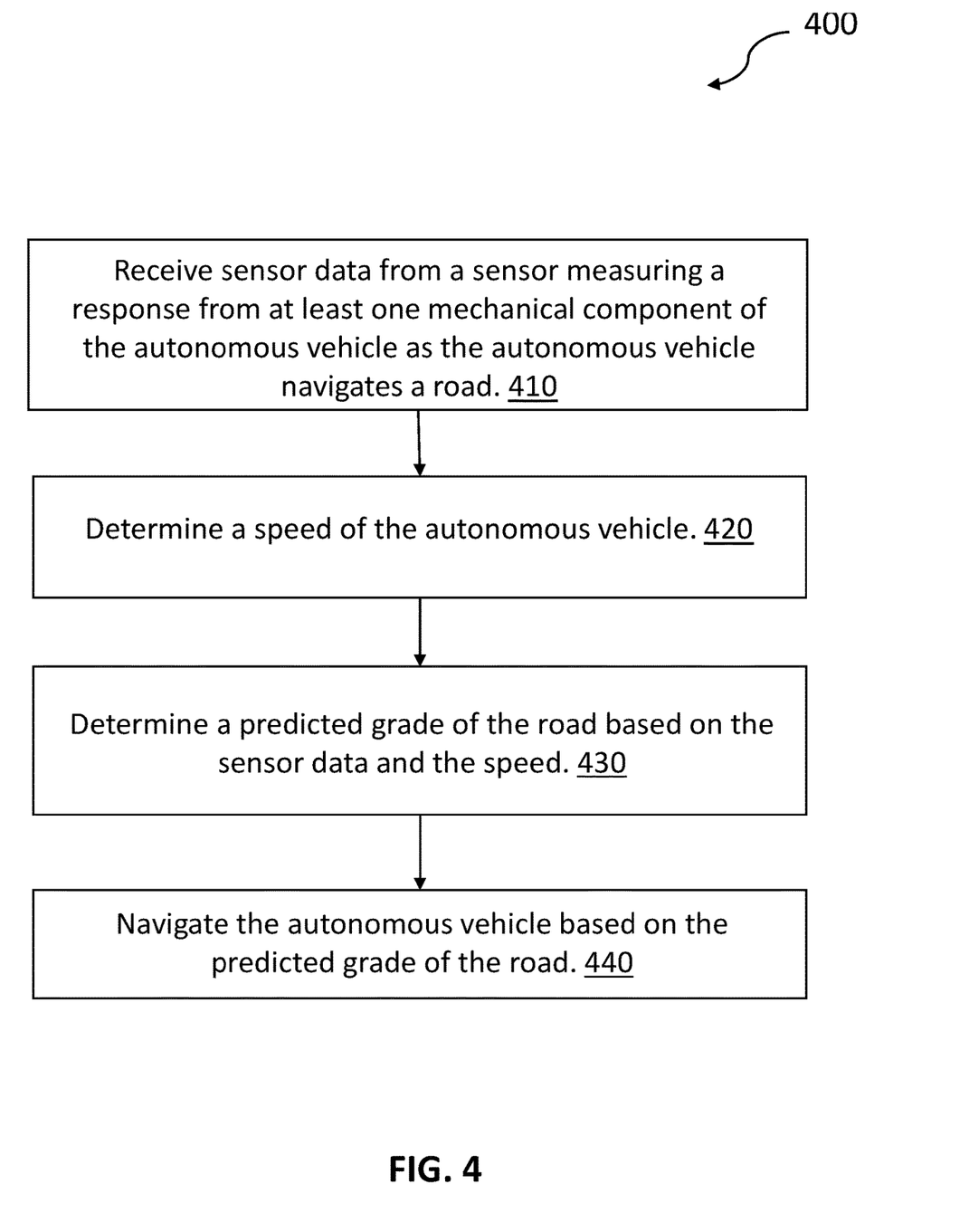
FIG. 4 is a flow diagram of an example method of estimating a grade of a road upon which a vehicle is traveling using sensor data from sensors mounted on the vehicle, according to an embodiment.

The memory 214 of autonomy system 250 may store data and/or software routines that may assist the autonomy system 250 in performing its functions, such as the functions of the perception module 202, the localization module 204, the vehicle control module 206, a road analysis module 300 of FIG. 3, and the method 400 of FIG. 4. The memory 214 may store any data described herein relating to the grade prediction techniques described herein, which may be generated based on data (e.g., sensor data) captured via various components of the autonomous vehicle (e.g., various sensors, the perception module 202, the mapping/localization module 204, the vehicle control module 206, the processor 210, etc.). Further, the memory 214 may also store data received from various inputs associated with the autonomy system 250, such as perception data from the perception system.

As noted above, perception module 202 may receive input from the various sensors, such as camera system 220, LiDAR system 222, GNSS receiver 208, and/or IMU 224, (collectively "perception data") to sense an environment surrounding the truck and interpret it. To interpret the surrounding environment, the perception module 202 (or "perception engine") may identify and classify objects or groups of objects in the environment. For example, the truck 200 may use the perception module 202 to identify one or more objects (e.g., pedestrians, vehicles, debris, road signs, etc.) or features of the roadway 114 (e.g., intersections, lane lines, shoulder lines, geometries of road features, lane types, etc.) before or beside a vehicle and classify the objects in the road. In some embodiments, the perception module 202 may include an image classification function and/or a computer vision function.

The system 150 may collect perception data. The perception data may represent the perceived environment surrounding the vehicle and may be collected using aspects of the perception system described herein. The perception data can come from, for example, one or more of the LiDAR systems, the camera system, and various other externally facing sensors and systems on board the vehicle (e.g., the GNSS receiver, etc.). For example, on vehicles having a sonar or radar system, the sonar and/or radar systems may collect perception data. As the truck 102 travels along the roadway 114, the system 150 may continually receive data from the various systems on the truck 102. In some embodiments, the system 150 may receive data periodically and/or continuously.

With respect to FIG. 1, the truck 102 may collect perception data that indicates presence of the lane lines 116, 118, 120. The perception data may indicate the presence of a line defining a shoulder of the road. Features perceived by the vehicle should track with one or more features stored in a digital map (e.g., in the localization module 204), as described herein. Indeed, with respect to FIG. 1, the lane lines that are detected before the truck 102 is capable of detecting the bend 128 in the road (that is, the lane lines that are detected and correlated with a known, mapped feature) will generally match with features in the stored map and the vehicle will continue to operate in a normal fashion (e.g., driving forward in the left lane of the roadway or per other local road rules). However, in the depicted scenario, the vehicle approaches a new bend 128 in the road that is not stored in the map data because the lane lines 116, 118, 120 have shifted right from their original positions 122, 124, 126.

For example, the detection systems may detect the lane lines 116, 118, 120 and may compare the geometry of detected lane lines with a corresponding expected geometry of lane lines stored in a digital map. The features may be stored as points (e.g., signs, small landmarks, etc.), lines (e.g., lane lines, road edges, etc.), or polygons (e.g., lakes, large landmarks, etc.) and may have various properties (e.g., style, visible range, refresh rate, etc.), which properties may control how the system 150 interacts with the various features. Based on the comparison of the detected features with the features stored in the digital map(s), the system may generate a confidence level, which may represent a confidence of the vehicle in its location with respect to the features on a digital map and hence, its actual location. Additionally, and as described in further detail herein, the system 150 may update the digital maps to correct any inaccuracies or errors detected from the perception data.

The image classification function may determine the features of an image (e.g., a visual image from the camera system 220 and/or a point cloud from the LiDAR system 222). The image classification function can be any combination of software agents and/or hardware modules able to identify image features and determine attributes of image parameters to classify portions, features, or attributes of an image. The image classification function may be embodied by a software module that may be communicatively coupled to a repository of images or image data (e.g., visual data and/or point cloud data) which may be used to detect and classify objects, road features, and/or features in real-time image data captured by, for example, the camera system 220 and/or the LiDAR system 222. In some embodiments, the image classification function may be configured to detect and classify features based on information received from only a portion of the multiple available sources. For example, in the case that the captured visual camera data includes images that may be blurred, the system 250 may identify objects based on data from one or more of the other systems (e.g., LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the truck 200 (e.g., lane lines). The computer vision function may use, for example, an object recognition algorithm, video tracing, one or more photogrammetric range imaging techniques (e.g., a structure from motion (SfM) algorithm), or other computer vision techniques. Objects or road features detected via the computer vision function may include, but are not limited to, road signs (e.g., speed limit signs, stop signs, yield signs, informational signs, traffic signals such as traffic lights, signs or signs that direct traffic such as right-only or no-right-turn signs, etc.), obstacles, other vehicles, lane lines, lane widths, shoulder locations, shoulder width, or construction-related objects (e.g., cones, construction signs, construction-related obstacles, construction zones, etc.), among others.

The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of its motion, size, etc.). The computer vision function may be embodied by a software module that may be communicatively coupled to a repository of images or image data (e.g., visual data and/or point cloud data), and may additionally implement the functionality of the image classification function.

Mapping/localization module 204 receives perception data that can be compared to one or more digital maps stored in the mapping/localization module 204 to determine where the truck 200 is in the world and/or or where the truck 200 is on the digital map(s). In particular, the mapping/localization module 204 may receive perception data from the perception module 202 and/or from the various sensors sensing the environment surrounding the truck 200 and may correlate features of the sensed environment with details (e.g., digital representations of the features of the sensed environment) on the digital maps. The digital map may have various levels of detail and can be, for example, a raster map, a vector map, etc. The digital maps may be stored locally on the truck 200 and/or stored and accessed remotely. In at least one embodiment, the truck 200 deploys with sufficiently stored information in one or more digital map files to complete a mission without connecting to an external network during the mission.

A centralized mapping system may be accessible via network 260 for updating the digital map(s) of the mapping/localization module 204. The digital map may be built through repeated observations of the operating environment using the truck 200 and/or trucks or other vehicles with similar functionality. For instance, the truck 200, a specialized mapping vehicle, a standard autonomous vehicle, or another vehicle can run a route several times and collect the location of all targeted map features relative to the position of the vehicle, conducting the map generation and correlation. These repeated observations can be averaged together in a known way to produce a highly accurate, high-fidelity digital map. This generated digital map can be provided to each vehicle (e.g., from the network 260 to the truck 200) before the vehicle departs on its mission so it can carry it on board and use it within its mapping/localization module 204. Hence, the truck 200 and other vehicles (e.g., a fleet of trucks similar to the truck 200) can generate, maintain (e.g., update), and use their own generated maps when conducting a mission.

The generated digital map may include an assigned confidence score assigned to all or some of the individual digital features representing a feature in the real world. The confidence score may be meant to express the level of confidence that the position of the element reflects the real-time position of that element in the current physical environment. Upon map creation, after appropriate verification of the map (e.g., running a similar route multiple times such that a given feature is detected, classified, and localized multiple times), the confidence score of each element will be very high, possibly the highest possible score within permissible bounds.

The vehicle control module 206 may control the behavior and maneuvers of the truck 200. For example, once the systems on the truck have determined its location with respect to map features (e.g., intersections, road signs, lane lines, etc.) of the world map, the truck 200 may use the vehicle control module 206 and its associated systems to plan and execute maneuvers and/or routes with respect to the features of the environment identified in the world map. The vehicle control module 206 may make decisions about how the truck 200 will move through the environment to get to its goal or destination as it completes its mission. The vehicle control module 206 may consume information from the perception module 202 and the maps/localization module 204 to know where it is relative to the surrounding environment and what other traffic actors are doing.

The vehicle control module 206 may be communicatively and operatively coupled to a plurality of vehicle operating systems and may execute one or more control signals and/or schemes to control operation of the one or more operating systems; for example, the vehicle control module 206 may control one or more of a vehicle steering system, a propulsion system, and/or a braking system. The propulsion system may be configured to provide powered motion for the truck and may include, for example, an engine/motor, an energy source, a transmission, and wheels/tires. The propulsion system may be coupled to and receive a signal from a throttle system, for example, which may be any combination of mechanisms configured to control the operating speed and acceleration of the engine/motor and, thus, the speed/acceleration of the truck. The steering system may be any combination of mechanisms configured to adjust the heading or direction of the truck. The brake system may be, for example, any combination of mechanisms configured to decelerate the truck (e.g., friction braking system, regenerative braking system, etc.). The vehicle control module 206 may be configured to avoid obstacles in the environment surrounding the truck and use one or more system inputs to identify, evaluate, and modify a vehicle trajectory. The vehicle control module 206 is depicted as a single module but can be any combination of software agents and/or hardware modules capable of generating vehicle control signals operative to monitor systems and controlling various vehicle actuators. The vehicle control module 206 may include a steering controller for vehicle lateral motion control and a propulsion and braking controller for vehicle longitudinal motion.

In disclosed embodiments of a system for predicting the grade of the road, the system 150, 250 collects perception data on objects corresponding to the road upon which the truck 200 is traveling, may be traveling in the future (e.g., another road in an intersection), or a road or lane adjacent to which the truck 200 is traveling. Such objects are sometimes referred to herein as target objects. Perception data may also be collected for various road features, including road features relating to the geometry of a road, a shoulder, or one or more lanes of the road, as well as road features indicating a type of road or a condition of a road upon which the truck 200 is traveling or may travel. Collected perception data on target objects may be used to detect various objects using object detection or classification techniques, as described herein. The predicted grade of the road upon which the vehicle is traveling can be used to estimate the relative position and expected trajectory of tracked objects with respect to the truck 200.

In an embodiment, road analysis module 230 executes artificial intelligence model(s) to predict one or more road features or one or more attributes of detected target objects. The artificial intelligence model(s) may be configured to ingest data from at least one sensor of the autonomous vehicle and predict the attributes of the object. In an embodiment, the artificial intelligence module is configured to predict a plurality of predetermined attributes of each of a plurality of detected target objects relative to the truck 200. The predetermined attributes may include a relative velocity of the respective target object relative to the autonomous vehicle and an effective mass attribute of the respective target object. In an embodiment, the artificial intelligence model(s) include predictive machine learning model(s) that may be continuously trained using updated data, e.g., relative velocity data, mass attribute data, target object classification data, and road feature data. In various embodiments, the artificial intelligence model(s) may employ any class of algorithms that are used to understand relative factors contributing to an outcome, estimate unknown outcomes, discover trends, and/or make other estimations based on a data set of factors collected across prior trials. In an embodiment, the artificial intelligence model(s) may refer to methods such as logistic regression, decision trees, neural networks, linear models, and/or Bayesian models.

The truck 200 may include additional power output sensors 252, which may be utilized to directly or indirectly determine the power output of the engine of the truck 200. For example, the power output sensors 252 may include one or more throttle position sensors, which monitor the throttle position. The throttle position can indicate an amount of the fuel/air mixture sent into the engine, where a larger throttle opening allows more fuel and air into the engine, which can generate more power. The power output of the engine can be estimated, in some implementations, based on the throttle position of the engine identified by the throttle position sensor.

The power output sensors 252 may include a mass airflow sensor, which can measure the amount of air entering the engine. Because the power output of the engine during operation of the truck 200 is a function of the fuel/air mixture being combusted in the engine, the amount of air entering the engine can be utilized to estimate the power output of the engine. The power output sensors 252 may include one or more revolutions-per-minute (RPM) sensors, which can measure the speed of the engine, wheels, crankshaft, or other rotating components of the truck 200. The power output sensors 252 may include one or more torque sensors, which measure the torque being delivered to the wheels of the truck 200. The output power of the engine can be calculated as the product of the torque applied to the wheels and the rotational speed of the wheels. The power output sensors 252 can include a speedometer, which can measure the speed of the truck 200 while the truck 200 is operating. In some implementations, the system 150, 250 can receive a signal indicating the weight of the truck 200, which can be utilized in connection with the power output information of the power output sensors 252 to predict the grade of the road upon which the truck 200 is traveling.

FIG. 3 shows a road analysis module 300 of system 150, 250. The road condition analysis module 300 includes velocity estimator 310, effective mass estimator 320, object visual parameters component 330, target object classification component 340, and the grade prediction component 350. These components of road analysis module 300 may include software-based components and/or hardware-based components.

Velocity estimator 310 may determine the relative velocity of target objects relative to the ego vehicle. Effective mass estimator 320 may estimate effective mass of target objects, for example, based on object visual parameters signals from object visual parameters component 330 and object classification signals from target object classification component 340. Object visual parameters component 330 may determine visual parameters of a target object such as size, shape, visual cues, and other visual features in response to visual sensor signals and generate an object visual parameters signal. Target object classification component 340 may determine a classification of a target object using information contained within the object visual parameters signal, which may be correlated to various objects and generate an object classification signal. For instance, the target object classification component 340 can determine whether the target object is a plastic traffic cone or an animal.

Target objects may include moving objects, such as other vehicles, pedestrians, and cyclists in the proximal driving area. Target objects may include fixed objects such as obstacles; infrastructure objects such as rigid poles, guardrails, or other traffic barriers; and parked cars. Fixed objects, also herein referred to herein as static objects and non-moving objects, can be infrastructure objects as well as temporarily static objects such as parked cars. Target objects may be detected, in part, based on the predicted grade of the road. For example, the target object classification component 340 may utilize the grade of the road as an input relative to the position of the ego vehicle to detect and classify objects in the environment.

The target object classification component 340 can determine additional characteristics of the road, including but not limited to characteristics of signs (e.g., speed limit signs, stop signs, yield signs, informational signs, signs or signs that direct traffic such as right-only or no-right turn signs, etc.), traffic signals such as traffic lights, as well as geometric information relating to the road. The target object classification component 340 can execute artificial intelligence models, for example, which receive sensor data (e.g., perception data as described herein, pre-processed sensor data, etc.) as input and generate corresponding outputs relating to the characteristics of the road or target objects. For example, the artificial intelligence model(s) may generate lane width information, lane line location information, predicted geometries of lane lines, a number of lanes in a road, a location or presence of a shoulder of the road, or a road type (e.g., gravel, paved, grass, dirt/grass, etc.) or a roadway type (e.g., highway, city road, double-yellow road, etc.).

Externally facing sensors may provide system 150, 250 with data defining distances between the ego vehicle and target objects or road features in the vicinity of the ego vehicle and with data defining direction of target objects from the ego vehicle. Such distances can be defined as distances from sensors, or sensors can process the data to generate distances from the center of mass or other portion of the ego vehicle. The externally facing sensors may provide system 150, 250 with data relating to lanes of a multi-lane roadway upon which the ego vehicle is operating. The lane information can include indications of target objects (e.g., other vehicles, obstacles, etc.) within lanes, lane geometry (e.g., number of lanes, whether lanes are narrowing or ending, whether the roadway is expanding into additional lanes, etc.), or information relating to objects adjacent to the lanes of the roadway (e.g., an object or vehicle on the shoulder, on on-ramps or off-ramps, etc.). Such information can be utilized by the various components of the system 150, 250 to generate or update the world map as described herein.

In an embodiment, the system 150, 250 collects data relating to target objects or road features within a predetermined region of interest (ROI) in proximity to the ego vehicle. Objects within the ROI may satisfy predetermined criteria for distance from the ego vehicle. The ROI may be a region for which the world map is generated in updated, in some implementations. The ROI may be defined with reference to parameters of the vehicle control module 206 in planning and executing maneuvers and/or routes with respect to the features of the environment. In an embodiment, there may be more than one ROI in different states of the system 150, 250 in planning and executing maneuvers and/or routes with respect to the features of the environment, such as a narrower ROI and a broader ROI. For example, the ROI may incorporate data from a lane detection algorithm and may include locations within a lane. The ROI may include locations that may enter the ego vehicle's drive path in the event of crossing lanes, accessing a road junction, making swerve maneuvers, or other maneuvers or routes of the ego vehicle. For example, the ROI may include other lanes travelling in the same direction, lanes of opposing traffic, edges of a roadway, road junctions, and other road locations in collision proximity to the ego vehicle.

In an embodiment, the system 150, 250 can generate a high-definition (HD) map, at least portions of which may be incorporated into a world model used by the autonomous vehicle to navigate. The system 150, 250 may generate an HD map by utilizing various data sources and advanced algorithms. The data sources may include information from onboard sensors, such as cameras, LiDAR, and radar, as well as data from external sources, such as satellite imagery and information from other vehicles. The system 150, 250 may collect and process the data from these various sources to create a high-precision representation of the road network. The system 150, 250 may use computer vision techniques, such as structure from motion, to process the data from onboard sensors and create a 3D model of the environment. This model may then be combined with the data from external sources to create a comprehensive view of the road network.

The system 150, 250 may also apply advanced algorithms to the data, such as machine learning and probabilistic methods, to improve the detail of the road network map. The algorithms may identify features, such as lane markings, road signs, traffic lights, and other landmarks, and label them accordingly. The resulting map may then be stored in a format that can be easily accessed and used by the autonomous vehicle. The system 150, 250 may use real-time updates from the vehicle's onboard sensors to continuously update the HD map data of the world model as the vehicle moves, as described herein. This enables the vehicle to maintain an up-to-date representation of its surroundings in the world model and respond to changing conditions in real time or near real time.

The grade prediction component 350 can predict the grade of the road upon which the ego vehicle is traveling based on sensor data captured by the various sensors of the ego vehicle. The grade prediction component 350 may perform various functionality described in connection with FIG. 4 to monitor the speed of the vehicle relative to the power output of the engine or other component of the vehicle. Using the methods and systems discussed herein, a processor of the autonomous vehicle may utilize the power output of the engine and the speed to determine whether the ego vehicle is traveling uphill, downhill, or on a flat road, as well as estimate the slope of the road (e.g., the grade of the road) while the ego vehicle is driving. The grade prediction component 350 may provide the grade information as input to object detection algorithms, models, or world-mapping functions to establish the position and predicted trajectory of objects in the environment surrounding the ego vehicle.

In some implementations, the grade prediction component 350 can transmit the predictions of road grade to one or more remote servers. The remote servers can utilize the corrections to update remotely stored maps, which may subsequently be transmitted to other autonomous vehicles to provide for efficient navigation of the areas to which corrections were applied. The grade prediction component 350 may, in some implementations, compare the predicted grade to pre-generated grade information for the road in locally stored map data to determine whether the grade of the road has changed. If the grade of the road has changed by an amount that satisfies a threshold, the grade prediction component 350 may transmit an indication that the locally stored map data is incorrect, with the predicted grade data for the road determined based on the sensors of the ego vehicle. The grade prediction component 350 may determine the grade of the road over time, for example, continuously, periodically, or upon detecting a change in speed or engine power output of the vehicle.

FIG. 4 is a flow diagram of an example method 400 of generating semantic corrections for a world model for autonomous vehicle navigation, according to an embodiment. The steps of the method 400 of FIG. 4 may be executed, for example, by an autonomous vehicle system, including the system 150, 250, the road analysis module 300, or combinations thereof, according to some embodiments. The method 400 shown in FIG. 4 comprises execution steps 410-440. However, it should be appreciated that other embodiments may comprise additional or alternative execution steps or may omit one or more steps altogether. It should also be appreciated that other embodiments may perform certain execution steps in a different order. Steps discussed herein may also be performed simultaneously or near-simultaneously with one another.

The method 400 of FIG. 4 is described as being performed by an autonomous vehicle system (e.g., the system 150, the system 250, the road analysis module 300, etc.). However, in some embodiments, one or more of the steps may be performed by different processor(s) or any other computing device. For instance, one or more of the steps may be performed via a cloud-based service or another processor in communication with the processor of the autonomous vehicle and/or its autonomy system. Although the steps are shown in FIG. 4 as having a particular order, it is intended that the steps may be performed in any order. It is also intended that some of these steps may be optional.

At step 410, the autonomous vehicle system (e.g., the system 150, 250, the road analysis module 300, etc.) of an autonomous vehicle (e.g., the truck 102, the truck 200, etc.) can receive sensor data from one or more sensors (e.g., the power output sensors 252, etc.) measuring a response from at least one mechanical component of the autonomous vehicle as the autonomous vehicle navigates a road. The response may be, for example, a power output of the engine of the autonomous vehicle, the power exerted by the wheels of the autonomous vehicle, or power provided by a transmission system of the autonomous vehicle. The power output may be determined based on signals from rotational sensors (e.g., RPM sensors), torque sensors, or throttle position sensors, among others. The autonomous vehicle system can retrieve the sensor data using sensor data polling requests automatically transmitted to the sensors of the autonomous vehicle. In some implementations, the sensor data may be captured and stored in one or more data structures automatically by one or more sensors or other components of the sensor data, may be received in response to requests automatically transmitted to the sensors, or may be captured and stored in one or more data structures.

The autonomous vehicle system may, in some implementations, retrieve sensor data from power output sensors of the autonomous vehicle upon detecting a condition. The condition may be, but is not limited to, a change in speed or a change in direction (e.g., determined based on magnetometer/IMU measurement(s), detected actuation of steering mechanisms, etc.). In some implementations, the autonomous vehicle system can retrieve sensor data from the power output sensors periodically, continuously, or in response to a request (e.g., from a remote server, another computing system, etc.) to begin predicting road grade information. In some implementations, the autonomous vehicle system can retrieve the sensor data upon determining that road grade information for the road upon which the autonomous vehicle is traveling is not locally stored in a digital map.

At step 420, the autonomous vehicle system can determine a speed of the autonomous vehicle. The speed of the autonomous vehicle can be determined to estimate the grade of the autonomous vehicle as a function of the power output of the autonomous vehicle. For example, if the autonomous vehicle is providing relatively more power than is typical to achieve a certain speed on a flat road, the autonomous vehicle system can determine that the autonomous vehicle is going uphill. Similarly, if the autonomous vehicle is providing relatively less power output than is typical to achieve a certain speed on a flat road, the autonomous vehicle system can determine that the autonomous vehicle is going downhill. The slope of the road (e.g., the prediction of the grade) can therefore be determined as a function of the speed of the autonomous vehicle and the power output retrieved in step 410.

Various sensors can be utilized to determine the speed of the autonomous vehicle. For example, transmission sensors, such as electronic speedometers, may provide the speed of the autonomous vehicle to the autonomous vehicle system in response to a request. In some implementations, alternative sensors may be used, such as satellite navigation sensors (e.g., GNSS, etc.), IMUs, wheel speed sensors, or rotational speed sensors, among others. The autonomous vehicle system may monitor and control the speed of the autonomous vehicle over time, and therefore store and update the speed of the autonomous vehicle as the autonomous vehicle operates. The speed of the autonomous vehicle can be retrieved from the memory to perform grade prediction for the road.

At step 430, the autonomous vehicle system can determine a predicted grade of the road based on the sensor data and the speed. Because the power output by the engine to produce the current speed of the vehicle can indicate whether the autonomous vehicle is overcoming or working with gravity, the grade of the road can be predicted as a function of both the speed and the power output of the autonomous vehicle. In some implementations, the autonomous vehicle system may predict the road based on predetermined curve or set of values stored in a lookup table for the current power output of the autonomous vehicle given the current speed of the autonomous vehicle.

These values may be predetermined or pre-generated (e.g., received from one or more servers or computing devices), or may be determined dynamically according to a rule-based function. For example, the autonomous vehicle system may maintain an expected power output to maintain a particular speed on a flat road. Based on the degree to which the power output varies from this baseline, flat road value (e.g., greater than indicating uphill, less than indicating downhill), the autonomous vehicle system can determine the slope of the road on which it is travelling.

In some implementations, the autonomous vehicle system may execute an artificial intelligence model that is trained based on historical speed and power data captured from several vehicles traveling on roads of different grades. The artificial intelligence model may be any type of classification or regression model and can be trained to generate a prediction of the grade of the road using speed, power, and other inputs (e.g., weight, wind speed, etc.) that may be received by the autonomous vehicle system or captured via sensors of the autonomous vehicle. The artificial intelligence model may be trained by one or more remote servers and provided to the autonomous vehicle for use during mission tasks. The artificial intelligence model may be or include one or more of a linear regression model, a logistic regression model, a decision tree model, a neural network, and/or a Bayesian model, among others. In such implementations, the autonomous vehicle system can provide the speed of the autonomous vehicle and the output power of the autonomous vehicle system as input when executing the artificial intelligence model. The artificial intelligence model, once executed, can produce the prediction of the grade.

The predicted grade of the road may be generated as a slope value for the road and includes a measure of how steep the road is. In some implementations, the grade of the road may be defined as the vertical rise (in height) for every horizontal unit of distance and, in some implementations, may be generated or stored as a percentage, a ratio, or an angle. A positive grade may indicate that the road is sloping upwards, while a negative grade may indicate that the road is sloping downwards.

In some implementations, the autonomous vehicle system may additionally utilize the weight of the autonomous vehicle to determine the grade of the road. As the weight of the vehicle may impact the amount of power output required to maintain the speed of the vehicle at different road slopes, the autonomous vehicle system may further calculate the grade of the road as a function of the vehicle weight, the speed, and the power output. In one example, the weight may be provided as an additional input to the artificial intelligence model that generates the grade prediction. In another example, different vehicle weight ranges may be stored in association with different curves that define an estimated road grade for the current power output of the autonomous vehicle given the current speed of the autonomous vehicle. The weight may be received via an external computing system (e.g., at a weight station), or may be provided to the autonomous vehicle system prior to receiving the weight of the autonomous vehicle from an external computing device.

In some implementations, the autonomous vehicle system can generate a digital surface model of the road by capturing points from LiDAR sensors, radar sensors, or cameras of the autonomous vehicle. For example, the LiDAR sensors may produce a point cloud that models the environment proximate to the autonomous vehicle. In some implementations, the LiDAR data can be processed to remove noise from the point clouds. Cameras (e.g., stereo-cameras, three-dimensional (3D) cameras, etc.) may be utilized to produce similar models of the environment, including the road proximate to the autonomous vehicle. In some implementations, the grade of the road may be predicted based on the 3D models. For example, by using trained artificial intelligence models or other types of trained object detection models, the autonomous vehicle system can detect the road in the model produced via the LiDAR sensors, radar sensors, or cameras. The average position of points of the model representing the road that are close to the autonomous vehicle can be calculated and compared to other points further down the road (e.g., further away from the autonomous vehicle) to determine the slope of the line between the groups of points.

The slope of the line may be calculated as a rolling average value and may be utilized as a predicted grade. The predicted grade produced via the LiDAR sensors, radar sensors, and/or camera sensors may be averaged with the predicted grade determined based on the power output of the autonomous vehicle. In some implementations, the predicted grade generated using the LiDAR measurements can be compared to the predicted grade generated using the power output and speed of the autonomous vehicle. If the values are in agreement, the autonomous vehicle system can determine that the grade of the road has been predicted with a high confidence. The autonomous vehicle system may generate a confidence value for the grade prediction based on the similarity between the two grade measurements.

At step 440, the autonomous vehicle system can navigate the autonomous vehicle based on the predicted grade of the road. Once the grade of the road has been calculated, the autonomous vehicle system can perform various downstream functions that rely on accurate predictions of road grade, including but not limited to objected detection, mapping, and world model correction. For example, the autonomous vehicle system may execute one or more object detection algorithms (e.g., an object detection model) to detect an object on the road using the predicted grade of the road. The position of the object relative to the autonomous vehicle may affect the output of the object detection algorithms. Correctly compensating for changes in road grade can enable the autonomous vehicle system to more accurately detect and predict the trajectory of objects in the environment using the various perception techniques described herein. The positions and trajectories of objects in the environment can be provided as input to components that govern the autonomous navigation of the autonomous vehicle.

Additionally, the autonomous vehicle system may update map data stored in memory of the autonomous vehicle based on the grade of the road. For example, if grade information for a road is absent, the autonomous vehicle system can update the map data to include the predicted grade for the portion of the road upon which the autonomous vehicle is traveling. If grade information for the road does not match the predicted grade calculated using the techniques described herein, the autonomous vehicle system may replace the grade information stored in the map data with the predicted grade information. In some implementations, the autonomous vehicle system can transmit the predicted grade of the road to one or more remote servers, which may aggregate or otherwise utilize the predicted grade to generate maps for other autonomous vehicles.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code, it being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A system, comprising:
   one or more processors of an autonomous vehicle, the one or more processors configured to:

receive sensor data from a sensor measuring a response from at least one mechanical component of the autonomous vehicle as the autonomous vehicle navigates a road, the response including a power output of an engine of the autonomous vehicle;
determine a speed of the autonomous vehicle;
determine a predicted grade of the road based on the power output and the speed; and
navigate the autonomous vehicle based on the predicted grade of the road,
wherein the autonomous vehicle includes a light detection and ranging (LiDAR) sensor, and the one or more processors are further configured to:
determine a first predicted grade of the road based on the power output and the speed;
determine a second predicted grade of the road based on LiDAR points captured by the LiDAR sensor;
compare the first predicted grade with the second predicted grade; and
generate a confidence value of grade prediction based on the comparison.

2. The system of claim 1, wherein the sensor comprises a rotational speed sensor, a torque sensor, or a throttle position sensor.

3. The system of claim 1, wherein the one or more processors are further configured to determine the predicted grade of the road further based on a weight of the autonomous vehicle.

4. The system of claim 3, wherein the one or more processors are further configured to receive the weight of the autonomous vehicle from an external computing device.

5. The system of claim 1, wherein the one or more processors are further configured to transmit the predicted grade of the road to one or more remote servers.

6. The system of claim 1, wherein the one or more processors are further configured to execute an object detection model to detect an object on the road based on the predicted grade of the road.

7. The system of claim 1, wherein the one or more processors are further configured to update map data stored in memory of the autonomous vehicle based on the grade of the road.

8. A method, comprising:
receiving, by one or more processors of an autonomous vehicle, sensor data from a sensor measuring a response from at least one mechanical component of the autonomous vehicle as the autonomous vehicle navigates a road, the response including a power output of an engine of the autonomous vehicle;
determine, by the one or more processors, a speed of the autonomous vehicle;
determining, by the one or more processors, a predicted grade of the road based on the power output and the speed; and
navigating, by the one or more processors, the autonomous vehicle based on the predicted grade of the road,
wherein the autonomous vehicle includes a light detection and ranging (LiDAR) sensor, determining the predicted grade further comprising:
determining a first predicted grade of the road based on the power output and the speed;
determining a second predicted grade of the road based on the LiDAR points;
comparing the first predicted grade with the second predicted grade; and
generating a confidence value of grade prediction based on the comparison.

9. The method of claim 8, wherein the sensor comprises a rotational speed sensor, a torque sensor, or a throttle position sensor.

10. The method of claim 8, further comprising determining, by the one or more processors, the predicted grade of the road further based on a weight of the autonomous vehicle.

11. The method of claim 10, further comprising receiving, by the one or more processors, the weight of the autonomous vehicle from an external computing device.

12. The method of claim 8, further comprising transmitting, by the one or more processors, the predicted grade of the road to one or more remote servers.

13. The method of claim 8, further comprising executing, by the one or more processors, an object detection model to detect an object on the road based on the predicted grade of the road.

14. The method of claim 8, further comprising updating, by the one or more processors, map data stored in memory of the autonomous vehicle based on the grade of the road.

15. The system of claim 1, wherein the one or more processors are further configured to determine, via an artificial intelligence model, the predicted grade of the road, wherein the artificial intelligence model is trained with historical speed and power data.

16. The method of claim 8, wherein determining the predicted grade further comprises:
determining, via an artificial intelligence model, the predicted grade of the road, wherein the artificial intelligence model is trained with historical speed and power data.

* * * * *